United States Patent [19]

Alvarez et al.

[11] Patent Number: 4,615,590
[45] Date of Patent: Oct. 7, 1986

[54] OPTICALLY STABILIZED CAMERA LENS SYSTEM

[75] Inventors: Luis W. Alvarez, Berkeley; Arnold J. Schwemin, Danville, both of Calif.

[73] Assignee: Schwem Instruments, Pleasant Hill, Calif.

[21] Appl. No.: 631,670

[22] Filed: Jul. 17, 1984

[51] Int. Cl.$^4$ .................. G02B 27/64; G02B 7/18
[52] U.S. Cl. .................... 350/500; 350/287
[58] Field of Search .............. 350/500, 287, 631; 352/244; 344/70; 356/149

[56] References Cited

U.S. PATENT DOCUMENTS

| | | | |
|---|---|---|---|
| 3,468,596 | 9/1969 | Alvarez | 350/500 |
| 3,473,861 | 10/1969 | Humphrey | 350/500 |
| 3,475,073 | 10/1969 | Humphrey | 350/500 |
| 3,608,995 | 9/1971 | Humphrey | 350/500 |
| 3,824,000 | 7/1974 | Burns | 350/287 |
| 3,845,929 | 11/1974 | Reekie | 350/500 |
| 3,910,693 | 10/1975 | De La Cierva | 350/500 |
| 4,013,339 | 3/1977 | Ando et al. | 350/500 |
| 4,260,218 | 4/1981 | Gullicksen et al. | 350/500 |
| 4,316,649 | 2/1982 | Alvarez et al. | 350/500 |
| 4,404,592 | 9/1983 | Pepin et al. | 356/149 |
| 4,417,788 | 11/1983 | Alvarez et al. | 350/500 |

FOREIGN PATENT DOCUMENTS 134619 8/1983 Japan ................... 350/500

Primary Examiner—William H. Punter
Attorney, Agent, or Firm—Townsend and Townsend

[57] ABSTRACT

An optically stabilized camera lens system includes an objective lens mounted to the lens case and an optical train defining an optical path between the objective lens and a camera image plane. The optical train includes first a Humphrey prism, second a light reversing, cube corner element, third a zoom lens. Provision is made for replacement of the cube corner with a prism and use of a parity inverting prism such as a Dove or preferably a Pechan to provide an alternate path. Roll stabilization is provided by coupling the Pechan, Dove or equivalent parity reversing prism to a gyroscope so the prism becomes a derotating prism. The derotating prism rotates about the optical path at half the speed the case rotates about the optical axis to produce roll stabilization preferred in camera and video applications. The Humphrey prism is inertially mounted to the case, using a stabilizer to compensate for small accidental tilt and pan motions of the case. The tilt and pan stabilizer includes a Cardan suspension assembly including a first gimbal mounted to the case, a second gimbal pivotally mounted to the first gimbal and a precessor biased rotor mounted to the second gimbal. A third gimbal is pivotally mounted to the second gimbal; the Humphrey prism is pivotally mounted to the third gimbal. The Cardan suspension assembly provides a gyroscopically stabilized mount for the third gimbal.

11 Claims, 10 Drawing Figures

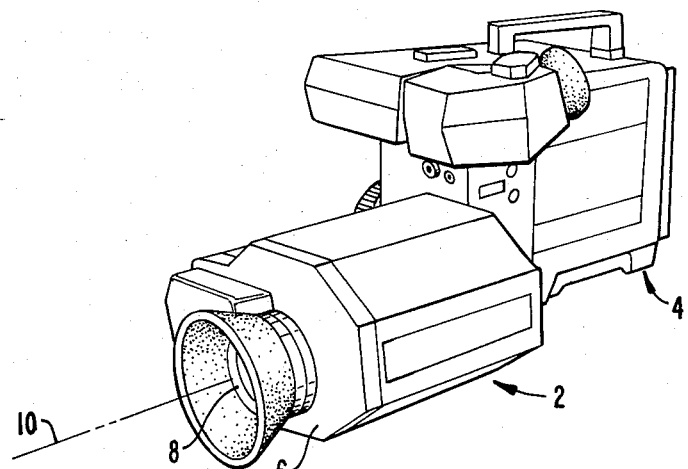
FIG._1.
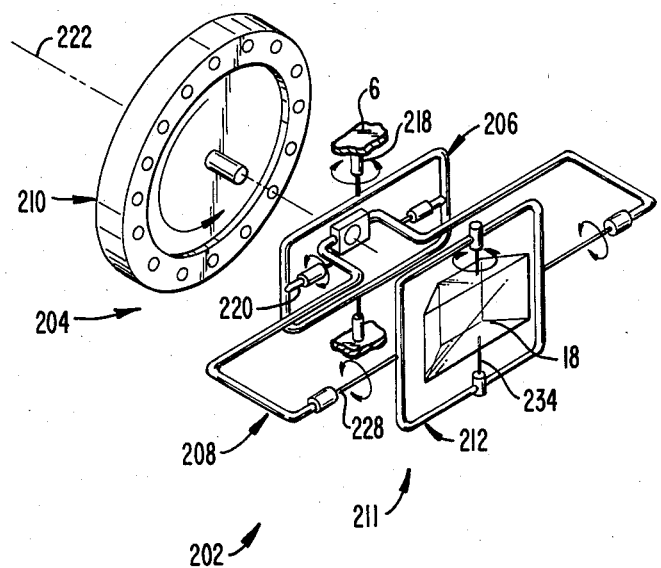
FIG._4.

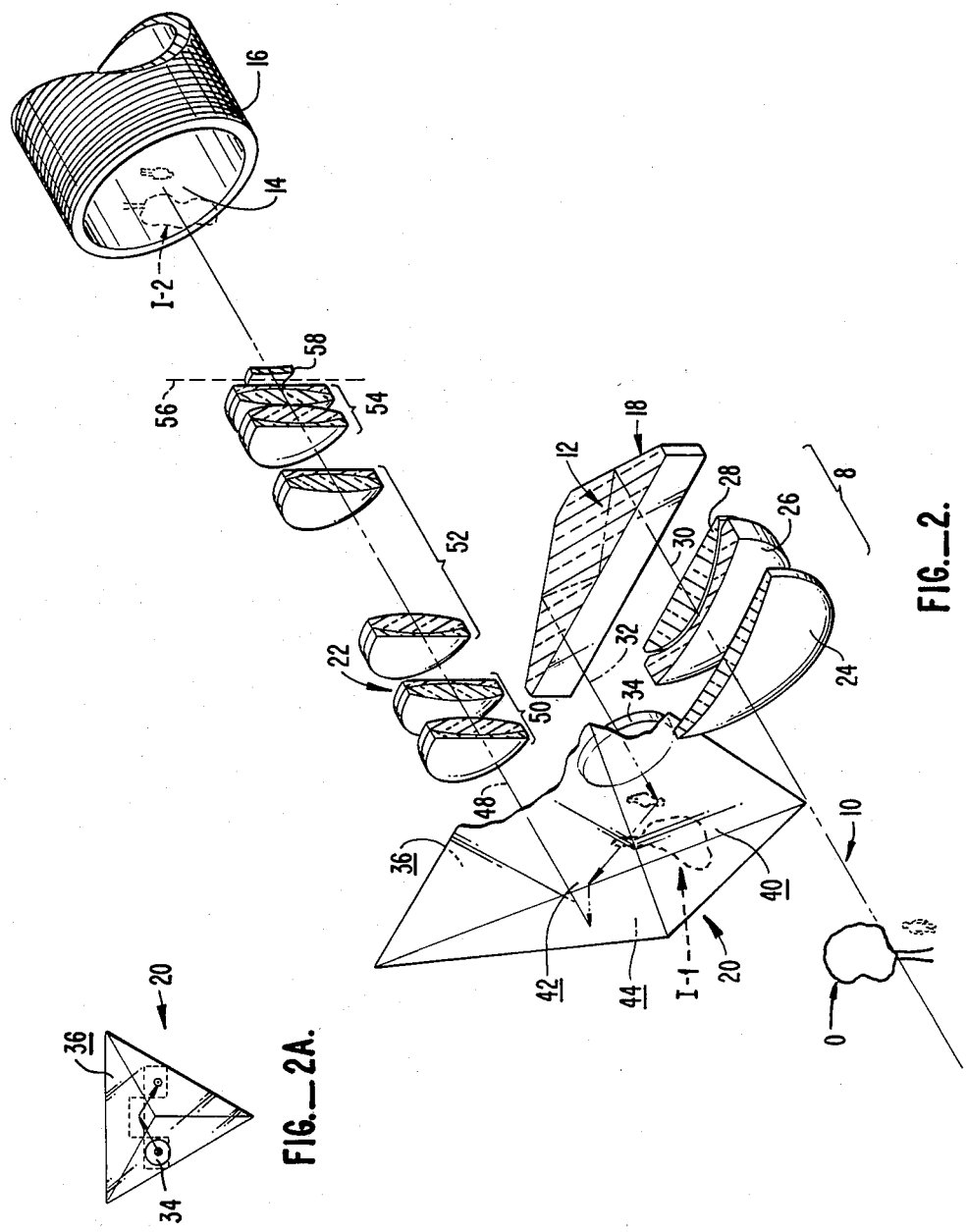

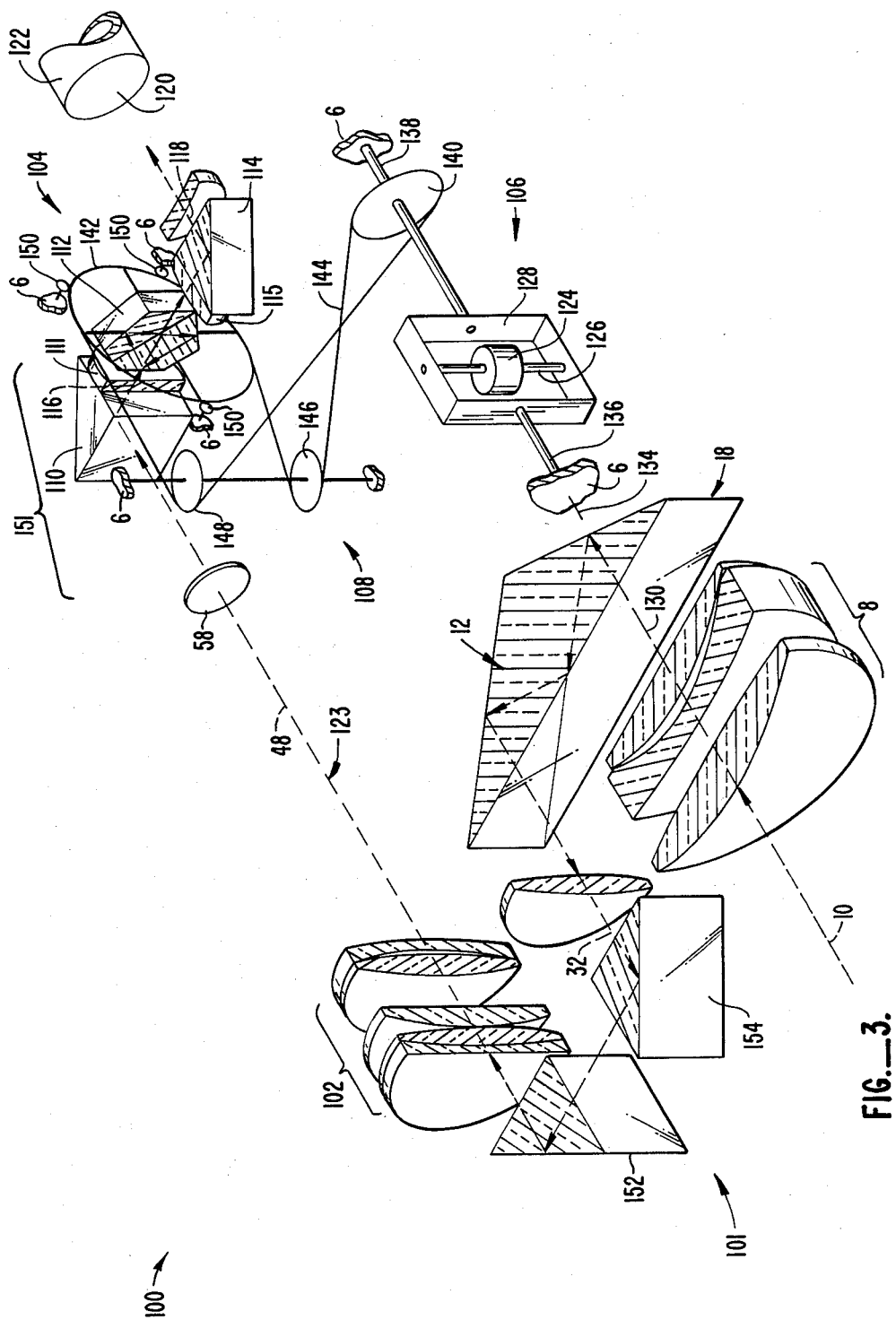
FIG._3.

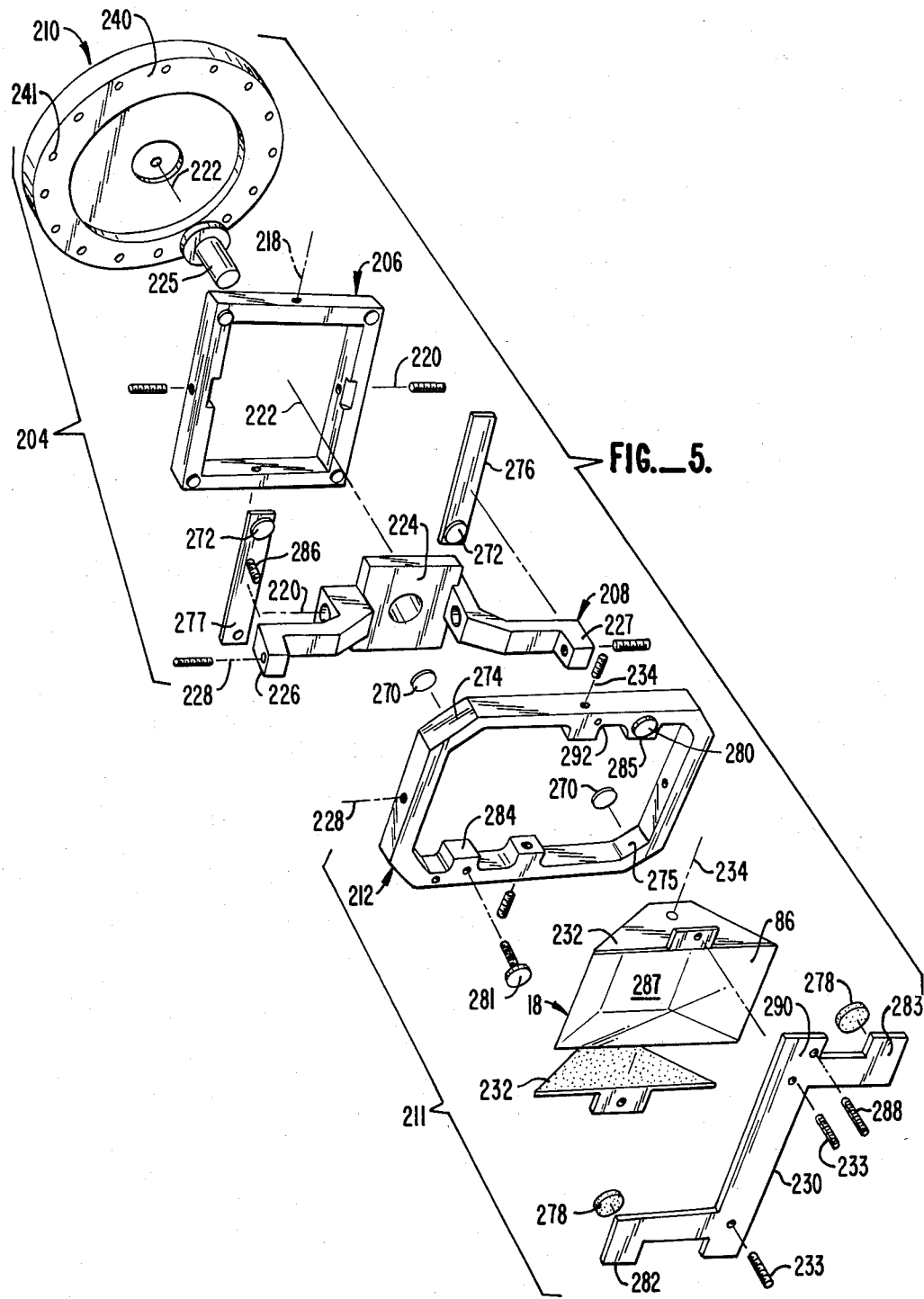
FIG._5.

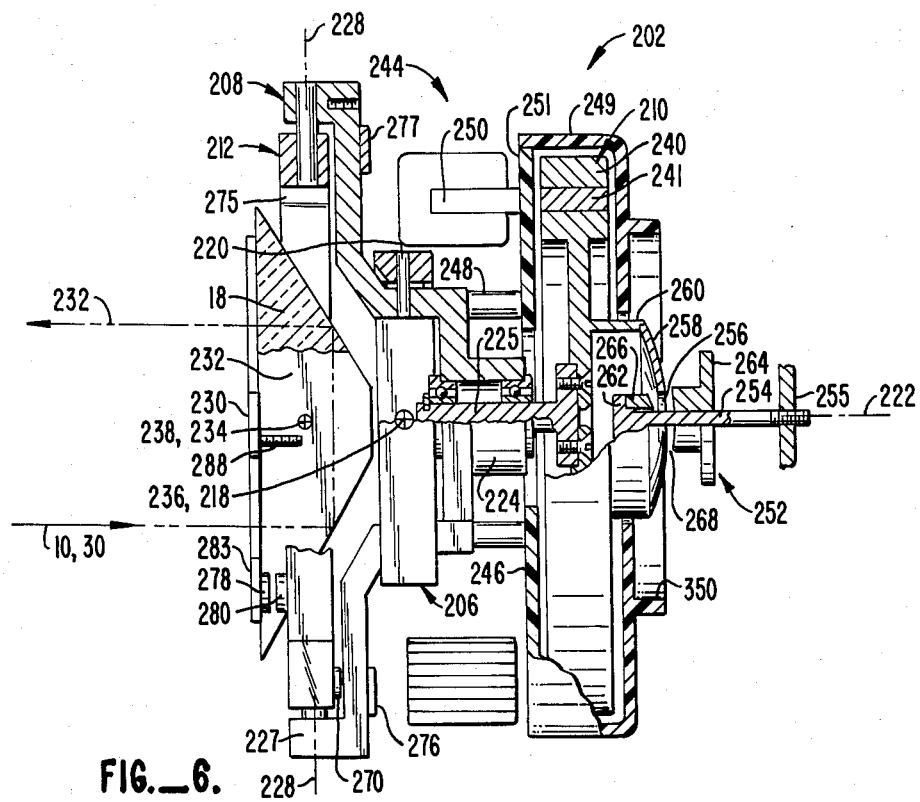

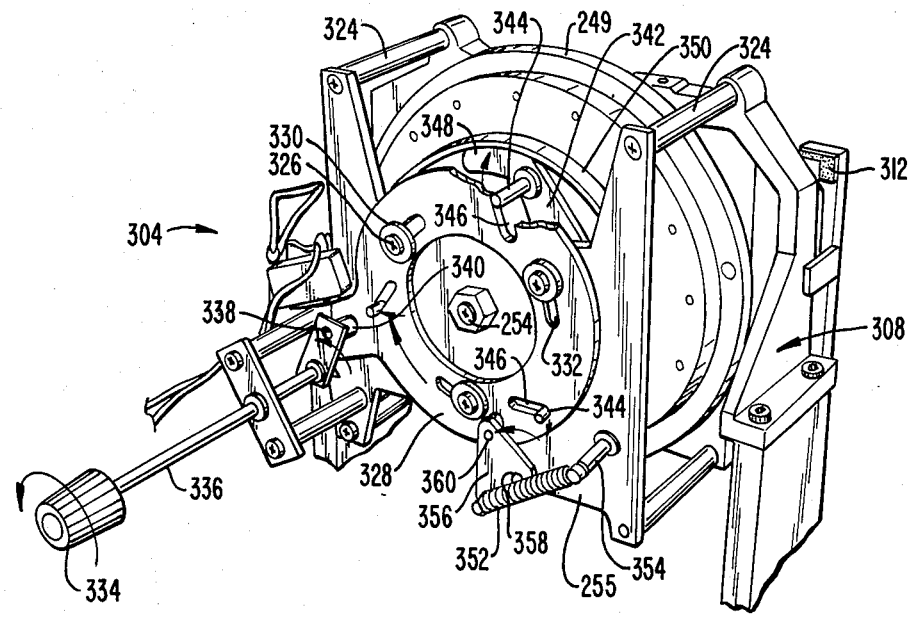
FIG._8A.
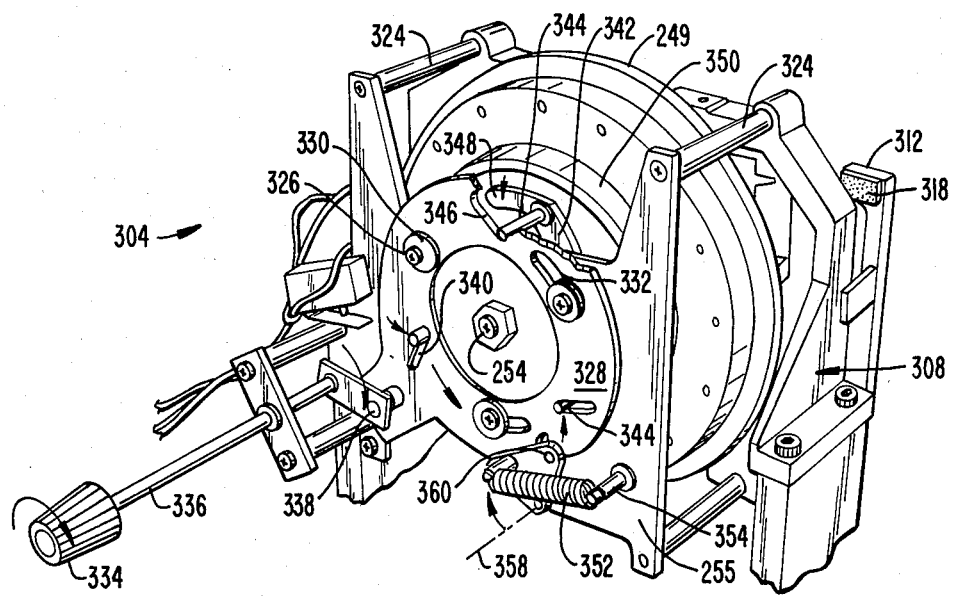
FIG._8B.

OPTICALLY STABILIZED CAMERA LENS SYSTEM

BACKGROUND OF THE INVENTION

1. Field of the Invention

This invention relates to the optical stabilization of images provided the recording surface of a hand-held video or film camera. More particularly, the invention relates to an optically stabilized zoom lens suitable for use with conventional hand-held cameras in lieu of conventional removable zoom lens.

2. Summary of the Prior Art

Stabilized optics using a reflecting and displacing prism, disclosed in U.S. Pat. No. 3,475,073, issued on Oct. 28, 1969 to William E. Humphrey, are known. The prism disclosed in this patent, hereinafter sometimes referred to as the Humphrey prism, provides optical stabilization against certain types of inadvertent movements of the instrument. This optical stabilization is achieved by the Humphrey prism, when used with an objective lens system, providing a stabilized image at a fixed location relative to the lens case. The Humphrey patent also discloses other reflecting and displacing optical elements, for example one using three mirrors, which together with the Humphrey prism are hereinafter collectively referred to as Humphrey-type optical elements.

Because of this stabilization property, Humphrey prisms have been used in gyroscopically stabilized optical devices. For example, one such device has been sold by Mark Systems of Cupertino, Calif. under the trademark MARK 1610. This device, which is a mono-binocular, uses a two degree of freedom gyroscope, commonly referred to as a Cardan suspension, to support the prism. This type of suspension, in which the prism is rigidly secured to one of the gimbals, helps to stabilize the viewer's image since small movements of the mono-binocular case will not affect the gyrostabilized prism. Although this instrument provides a stabilized image for the viewer, the resultant image is subject to high frequency vibrations, such as those produced by the spinning rotor of the gyroscope. The Humphrey U.S. Pat. No. 3,475,023 patent acknowledges the zoom lens assemblies and relay optics may be used with the prism stabilizing scheme therein disclosed. It does not disclose how such systems are optimized for practical use. Indeed, despite attempts to utilize these technology in the past, commercial success has not been achieved.

Devices that can stabilize the line of sight of an ordinary motion picture or video camera by stabilizing the camera itself have been in use for many years. These devices may employ either a gyro system or a greatly increased moment of inertia to accomplish such stabilization. For mechanical reasons such systems are large, heavy and expensive, and are therefore most often rented for special occasions, such as the production of documentaries, commercials, etc., where the picture-making can be scheduled at some predetermined and schedulable time in the future.

Electronic news gathering (ENG) is an increasingly important segment of the television industry. Even a casual review of a single week of TV national network newscasts will convince the viewer that fast-breaking news reporting of such events as airplane hi-jackings, riots, accidents, natural disasters and other such scenes shot from helicopters, while in a moving car, etc., do not have the benefit of image stabilization. If the TV networks were offered footage of ordinary news events with such glaring technical defects, they would reject them as being hopelessly amateurish. But because of their newsworthiness, these very unsteady shots are shown in spite of their obvious technical faults.

SUMMARY OF THE INVENTION

The present invention provides a camera, such as a video or motion picture camera, with an optically stabilized lens system, preferably a zoom lens system. The optically stabilized camera lens system includes an objective lens mounted to the lens case and an optical train defining an optical path between the objective lens and an image surface of the camera. The optical train includes a Humphrey-type reversing and displacing optical element, preferably a Humphrey prism, following the objective lens, a light reversing and displacing optical element following the Humphrey-type optical element which redirects the light from the Humphrey element to a zoom lens assembly; the zoom lens assembly provides an image to the image surface of the camera tube. The Humphrey prism is inertially mounted to the case to be stabilized in tilt and pan to compensate for small accidental motions of the case.

Two optical path embodiments are shown of the light reversing and displacing optics to impart conventional camera directionality to the lens system. First a cube corner may be used. Secondly, a displaced roof reflecting assembly may be used in combination with a parity inverting prism, such as a Dove, or more preferably a Pechan.

The reversing and displacing optical element is preferably a cube corner. In lieu of a cube corner the optically equivalent combination of a right angle prism and an Amici roof prism can be used. The cube corner uses three reflections to reverse and displace the light path while flipping the image upside down. The right angle prism bends the light path 90° while the Amici roof prism provides two reflections while bending the light 90° and flipping the image upside down, A first stabilized image is provided by the Humphrey-type optical element at or near the first reflective surface of the cube corner. The total number of reflections, three within the Humphrey prism and three within the cube corner, being an even number, maintains even parity of the image. This is necessary to keep a lower case p from looking like a lower case q. The light from the cube corner then passes through the zoom optics which focuses a second image at the image plane of the camera tube with proper parity but upside down, as is required for conventional video cameras.

The cube corner is preferably constructed so there is no overlap between the reflection surfaces. This is significant since it greatly increases the allowable angular manufacturing tolerances allowable from about ±2-3 arc seconds for an Amici roof plus right angle prisms to about ±10-20 arc minutes for the cube corner with non-overlapping reflection surfaces. This makes the cost of the cube corner significantly less than that of the amici plus right angle prism combination.

In some cases, such as with binoculars or other direct viewing devices, it is not desired to flip the image upside down. In those cases a penta prism can be used with a right angle prism as the reversing and displacing element. The penta prism bends the light 90° using two reflecting surfaces so the total number of reflections in such reversing and displacing element is three, just like with the cube corner.

In lieu of using the cube corner as the reversing and displacing optical element, one can use either two angled mirrors or two right angle prisms. If this is done, however, an odd number of total reflections (five) are produced so parity is lost. This can be remedied by inserting a prism, such as Pechan or Dove prism, along the optical path. The prism has an odd number of reflecting surfaces (five for the Pechan and one for the Dove) so even parity is restored. Also the prism can be oriented to either flip the image, as is normally required, or leave it erect.

Adding a prism provides an unexpected advantage for the user. This is so because derotating prisms, apart from having an odd number of reflections, rotate an image passing through them at twice the speed at which they are rotated. Although the optical element stabilizer stabilizes the Humphrey prism against small, inadvertent movements in tilt and pan, known as pitch and yaw in aeronautical terms, since the rotor axis is necessarily parallel to the optical axis, the image provided to the image surface of the camera tube is not stabilized for roll about the optical axis. Thus, adding a prism not only eliminates the need for an Amici roof prism but also allows the image to be roll stabilized—a distinct advantage for video and film cameras, but not for direct viewing devices. A prism having this characteristic will hereinafter be referred to as a derotating prism.

The derotating prism is mounted to the case to pivot about a portion of the optical path passing through it. The derotating prism is operably coupled to a gyro having a gimbal mounted to the case to pivot about an axis parallel to the optical axis. The axis of the gyro's rotor is in a direction other than parallel to the optical axis and preferably about 90° to that axis. The coupling is configured to rotate the derotating prism at half the speed at which the gimbal rotates relative to the case. Thus rolling the lens case about the optical axis, since the gyro rotor tends to remain in position, causes the gimbal to move relative to the case. The image provided the image plane remains stationary relative to the camera as the derotating prism is rotated at one-half the speed at which the camera and lens rolls about the optical axis.

The Humphrey prism is stabilized in tilt and pan by an optical element stabilizer. The optical element stabilizer also isolates the Humphrey prism from higher frequency vibrations, caused by the gyroscope motor or exerted on the case of the instrument, while remaining light and compact for ease of use and interchangeability with conventional camera lenses. The optical element stabilizer includes a two degree of freedom gyroscope, termed a Cardan suspension assembly, and a Humphrey prism isolation assembly which mounts the Humphrey prism to the Cardan suspension assembly. The isolation assembly includes a gimbal to which the Humphrey prism is pivotally mounted and which is itself pivotally mounted to a gimbal of the Cardan suspension assembly. The Cardan suspension assembly provides a gyroscopically stabilized mount for the Humphrey prism isolation assembly. The Humphrey prism isolation assembly acts as a mechanical low pass filter isolating the Humphrey prism from higher frequency vibrations, especially those produced by the rotor, bearings and other motor components.

The reader will realize that the inner gimbal helps accommodate balancing imperfections in the gimbal system. If one could be sure that the balance of the rotor and gimbal assembly mounting the Humphrey prism could be almost perfect after the instrument had been subject to periods of rough handling, the inner gimbal system would not be needed. This inner gimbal system is present to avoid the necessity of frequent rebalancing of the rotor. Additionally, the isolation gimbal system can cut down on the expense of the precise balancing job that would otherwise be required. It is important to understand that the isolation gimbal system is not essential to the working of this disclosure.

A precessor is used to bias the rotor so that the rotor axis tends to remain parallel to the optical axis of the instrument. The isolation assembly gimbal and the Humphrey prism are biased to their respective neutral positions by springs and dampers. The spring biasing is preferably provided using opposed magnets while damping is provided, in the preferred embodiment, using a threaded pin extending from one element into viscous material within a cavity in the other element, thus creating a dashpot. The biasing and damping provided by the isolation assembly is chosen to substantially damp out all the vibrations transmitted to the optical element having a frequency above about 2 Hz. The biasing and damping of the isolation assembly and the precessor is chosen to allow the optical instrument to be smoothly panned while eliminating vibrations from the rotor and external vibrations exerted on the lens case. The optical stabilizer of the invention can be used with various optical instruments, such as a hand held video camera and a hand held mono-binocular. It may also be used to help stabilize a still camera using a high power telephoto lens.

Permanent magnet precessors have the inherent characteristic that any slight angular deviation of the rotor axis from the optical axis will be countered by the precessor tending to realign the two axes. It is usually desirable that the precessor have what is termed a flat spot. That is, the precessor should be constructed so that no precession takes place unless the angular deviation is above some generally small angle, termed the flat spot angle, such as $\frac{1}{2}$ degree. With a precessor having such a flat spot the image from the optical instrument appears like it was taken on a tripod.

The precessor has a relatively long time constant so that the corrections it makes to the gyro axis are rather slow. This will produce, with, for example, a hand-held video camera, an image which tends to oscillate slowly right and left, and to a lesser degree up and down. Using the same signals from the sensors which are used to control the torquers, an indication can be provided on the camera's CRT viewer of any deviation of the gyro axis from the optical axis. This can be accomplished by superimposing two marks on the CRT viewer screen, one representing the gyro axis and the other the optical axis. This will allow the user to observe oscillation of the camera case in pitch and yaw. To keep the picture steady the user would just keep the optical axis (corresponding to the case's orientation) oscillating on either side of the gyro axis. Since the precessor is slow acting, only when the oscillations are, for example, about a point to the right of the gyro axis will the gyro axis precess to the right. In a moving picture viewfinder similar information could be presented in various ways, such as using arrays of light emitting diodes or crossed meter pointers. It should be noted that this aspect of the invention can be provided in conjunction with the sensors and torquers used to provide the flat spot in the precessor. However, this pitch and yaw deviation information can be had independently of providing a flat spot precessor. It will be appreciated that roll information could be provided in a similar manner.

The tilt and pan stabilizing gyroscope rotor acts as the rotor of a DC brushless motor. The rotor includes numerous permanent magnets imbedded about its periphery with the orientation of the poles alternating. The motor stator includes at least one electromagnet having poles placed opposite the permanent magnets of the rotor. The motor circuitry includes a Hall effect detector which senses the position of the moving permanent magnets. The movement of the magnets past the Hall effect detector causes the motor circuitry to reverse the polarity of the electromagnets, thus driving the rotor.

The rotor is provided with a wind shield, which is mounted to the second gimbal. The wind shield acts as a shroud surrounding most of the motor. The wind shield serves dual functions. First, it lowers the resistance of the rotor to spinning by keeping the rotor from pumping air from its interior portions to its exterior portions. This greatly extends the life of the batteries which are usually used to power the motor. Second, the wind shield effectively eliminates turbulent air currents on the prism within the instrument case which could otherwise cause it to wobble or vibrate.

A pair of caging mechanisms are provided to protect the optical stabilizer when not in use. One of the caging mechanisms is used to lock the windshield in place. Since the windshield is mounted to the gimbal of the Cardan suspension assembly to which the rotor is journaled, locking the windshield in place locks the Cardan suspension assembly in place also. The other caging mechanism includes a pivoting member which engages the Humphrey prism to keep it from pivoting. The Cardan suspension assembly caging is typically released first while the Humphrey prism is released second.

Two primary constraints are placed on the design of the optical path to enable the lens system to be used as a replacement for conventional zoom lenses. First, the image provided the image plane of the video or film camera, must have correct parity so that a p does not look like a q. This, as discussed above, is accomplished by providing an even number of reflections along the optical path. Second, the portion of the optical path at the image plane must be such to allow the camera body to be held in its conventional manner. Both conventional video cameras and conventional film cameras are made so the image plane is perpendicular to the optical axis and the optical path at the image plane is in the same direction as the optical axis. The Humphrey prism provides a stabilized first image at a point along the optical path following the Humphrey prism. If the first image were at a photo sensitive surface, the camera would appear to be pointing backwards, quite unacceptable for retrofit operations. To enable this stabilized first image to be used with conventional cameras alignment, the optical path must be reversed so that the optical path at the final image plane is parallel to and in the same direction as the optical axis. To do so, a reflecting and displacing optical element is mounted within the lens case following the Humphrey prism to intercept the optical path adjacent the first image and relay this image to the sensitive surface, which is typically in a video camera.

The present invention thus provides the user of mechanically unstabilized, typically shoulder mounted or hand-held cameras a stabilized zoom lens system which is light enough and inexpensive enough to be carried around and used when needed. The stabilized lens system is configured to be attachable to standard handheld and shoulder mounted cameras in the same manner in which conventional unstabilized zoom lenses are mounted. The present invention thus provides a stabilized zoom lens which can easily and quickly be substituted for a conventional unstabilized zoom lens. The present invention is particularly adaptable for use in electronic news gathering to provide a quality of picture which has heretofore not been commercially feasible, as it has been in the shooting of commercials, etc., which can be scheduled to permit the renting of the very expensive prior art mechanical stabilizers of the whole camera.

Other features and advantages will appear from the following description in which the preferred embodiments have been set forth in detail in conjunction with the accompanying drawings.

BRIEF DESCRIPTION OF THE DRAWINGS

FIG. 1 shows the optically stabilized camera lens system of the invention used with a conventional video camera.

FIG. 2 is a simplified isometric view of the elements comprising the optical path of the corner cube versions of this invention between the objective lens and the camera tube of the lens system of FIG. 1.

FIG. 2A is a front view of the cube corner assembly illustrating the preferred sequential use of each of the three surfaces of the corner cube.

FIG. 3 is a simplified isometric view of a second embodiment of the lens system of FIG. 1 including a Pechan prism adapted as a roll stabilizer positioned along the optical path between the zoom optics and the camera tube.

FIG. 4 is a schematic representation of the optical element stabilizer of the invention.

FIG. 5 is an exploded isometric view of the optical stabilizer of the invention illustrating the gimbals, optical element and rotor.

FIG. 6 is a partial cross-sectional plan view of the optical element stabilizer of FIG. 5 including the motor stators mounted to a printed circuit board, a wind shield device and a precessor.

FIGS. 7, 8A and 8B show the Humphrey prism and gyro caging mechanisms.

DETAILED DESCRIPTION OF THE PREFERRED EMBODIMENTS

Referring now to FIGS. 1 and 2, an optically stabilized camera lens system 2 is shown mounted to a conventional video camera 4. Lens system 2 includes a lens case 6 within which various optical elements described below are mounted. An objective lens assembly 8 is mounted to case 6 to accept light from object 0 along an optical axis 10. An optical path 12 is defined within case 6 between objective lens assembly 8 and an image plane 14 at the end of a camera tube 16. Lens system 2 is mounted to camera tube 16 as a replacement for a conventional zoom lens. A number of optical elements, specifically a Humphrey prism 18, a reflecting, inverting, and displacing optical element 20 and a zoom lens assembly 22, are positioned along optical path 12. Element 20 is a cube corner, although other optically equivalent elements could be used as well.

Objective lens assembly 8 includes first, second and third objective lenses 24, 26 and 28, all of conventional design. Humphrey prism 18 is inertially stabilized within case 6 with respect to inadvertent tilt and pan movements; this aspect is described in detail below with reference to FIGS. 4 to 7. Humphrey prism 18 follows objective lens assembly 8 along a first path segment 30 of optical path 12. The image of object 0 is reflected within Humphrey prism 18 three times so that the first image I-1 along a second path segment 32 no longer has even parity.

Reflecting, inverting and displacing optical element 20 follows Humphrey prism 18 along second path segment 32. Element 20 is fixedly mounted to case 6 and includes three mutually perpendicular reflecting surfaces 40, 42, and 44. A fixed lens 34 is mounted to the front face 36 of cube corner 20. Cube corner 20 is positioned so that surface 40 intersects optical path 12 generally at or behind where first stabilized image I-1 lies. U.S. Pat. No. 3,475,023 discusses how the Humphrey prism 18 provides an image stabilized with respect to the case.

Three reflections occur within cube corner 20 by virtue of its shape as the image progresses from second path segment 32 to a third path segment 48. Third path segment 48 extends from optical element 20 to image plane 14 of camera tube 16. The three reflections within optical element 20 also flip the image of object 0 upside down.

Mounted within case 6 along path segment 48 is zoom lens assembly 22. Assembly 22 is constructed and movably mounted within case 6 in a conventional manner and thus will not be described in detail. Zoom lens assembly 22 is shown in three different zoom positions 50, 52 and 54. Zoom position 50 is the high, 300 mm focal length position, position 52 is an intermediate focal length position and zoom position 54 is a low, 60 mm focal length position. An iris diaphragm is positioned at point 56 and a backing lens 58 is positioned along third path segment 48 following zoom lens assembly 22 to provide an appropriate second image I-2 of object 0 at image plane 14.

Assembly 22 is a zoom relay lens as contrasted with a conventional zoom lens. A conventional zoom lens takes parallel light, from a distant image, and focuses it at a film gate with varying equivalent focal lengths. A zoom relay lens takes light from a nearby object (the image formed by the objective lens) and focuses it at an image plane (on the camera tube) with varying magnification. Therefore, lens system 2 is quite unconventional, for camera use.

To obtain correct image parity, an even number of reflections along optical path 12 are needed. This is achieved by three reflections within Humphrey prism 18, and three reflections within cube corner 20. The image is turned upside down within cube corner 20, to compensate for the fact that the relay lens system inverts the image, so that the image provided image plane 14 is upside down as is necessary for conventional video cameras that use interchangeable lenses.

Referring to FIG. 3, a second optically stabilized camera lens system 100 is shown. Lens system 100 is similar to lens system 2 and includes an objective lens assembly 8, a Humphrey prism 18, a reflecting and displacing optical element 101, a zoom lens assembly 102 (shown at a high focal length position), a backing lens 58 and a derotating prism assembly 104 positioned between backing lens 58 and the image plane 120 of a camera tube 122. These elements are positioned along an optical path 123.

Derotating prism assembly 104 includes a conventional derotating prism 112 mounted between a negative lens, 111, and a positive lens, 115, arranged to lengthen the optical path, but keep the effective focal length the same as it would be without the presence of the derotating prism assembly. As shown, prism 112 axis is at a right angle to the main optical axis 10, but it could equally well be parallel to that optical axis. Negative lens 111 is mounted to a first right angle prism 110, which redirects light along optical path 123 at a right angle from third path segment 48 to a fourth path segment 116. Positive lens 115 is mounted to a second right angle prism 114 which bends path 123 along a fifth path segment 118 and to the image surface 120 of a camera tube 122.

Lens system 100 uses a Pechan, prism as derotating prism 112. Although a Dove prism can be used as well, a Dove prism only works in parallel light and its physical length, for a given aperture, is considerably greater than that for a Pechan prism. The Pechan prism is therefore preferred.

Incorporating a derotating prism along optical path 123 eliminates the need for the cube corner 20 of the embodiment of FIG. 2, which is relatively expensive. If the optics are to be used where it is not desired to have an inverted image, the derotating prism would simply be rotated 180° about optical axis 12. Also, any initial adjustment or setting of the horizon angle can be accomplished by an initial adjustment of derotating prism 112.

Derotating prism assembly 104 is mechanically coupled to a roll stabilizing gyro 106 by a mechanical coupling assembly 108. Roll stabilizing gyro 106 includes a rotor 124 mounted for rotation about a generally vertical first, rotor axis 126 to a gimbal 128. Gimbal 128 is pivotally mounted to lens case 6, illustrated schematically in FIG. 3, for rotation about a horizontal third axis 134. Axis 134 is collinear with optical axis 10 so that when camera 4 plus lens case 6 is rotated or rolled about optical axis 10, the support shafts 136, 138 mounting gimbal 128 to case 6 rotate a like amount. This provides a basis upon which mechanical coupling assembly 108 can rotate derotating prism 112 about fourth path segment 116 at one-half the speed of rotation of lens system 100 about optical axis 10.

Mechanical coupling assembly 108 includes a first pulley 140 coupled to a second pulley 142 by a flexible wire 144 which is guided through a 90° turn by a pair of guide pulleys 146, 148. Second pulley 142 surrounds derotating prism 112 and mounts prism 112 within the interior of second pulley 142. Second pulley 142 is mounted to case 6 by three evenly spaced apart support rollers 150 which engage the circumference of pulley 142, or equally well, a large diameter ball bearing system. Support rollers 150 are themselves mounted to case 106. Pulley 140 is half the diameter and thus half the circumference of pulley 142 so that a 2 to 1 speed reduction occurs between a rotational movement of shaft 138 (and thus pulley 140) and pulley 142 (and thus prism 112). This compensates for the fact that the rotating prism 112 tends to rotate the image twice the speed at which it is rotated. Thus pivotal movement of camera 4 about axis 10, otherwise known as roll, is compensated for by derotating prism 112, coupling assembly 108 and gyro 106, collectively known as the roll stabilizer 151.

A spring (not shown) can be used along wire 144 to eliminate backlash.

Referring now to FIG. 4, a preferred embodiment of an image position stabilizing assembly 202, is illustrated schematically. Assembly 202 will be described in some detail in that it comprises a significant aspect of the invention. Assembly 202 includes broadly a Cardan suspension assembly 204, a prism isolation assembly 211 and Humphrey prism 18. Cardan suspension assembly 204 includes a first gimbal 206, a second gimbal 208 and a rotor 210. Prism isolation assembly 211 includes a third gimbal 212 mounted to second gimbal 208, Humphrey prism 18 being pivotally mounted to gimbal 212. Stabilizer 202 is used to aid image stabilization of the first image I-1, shown in FIG. 2.

Referring also to FIGS. 5 and 6, first gimbal 206 is mounted to case 6 to pivot about a first, vertical axis 218. Second gimbal 208 is mounted within first gimbal 206 to pivot about a second, horizontal axis 220. Rotor 210 is mounted to a central bearing block portion 224 of second gimbal 208 by a rotor shaft 225 for rotation about a third, horizontal axis 222. Cardan suspension assembly 204, which is supported by case 6, is used to gyroscopically support prism isolation assembly 211 and prism 18 therewith.

Third gimbal 212 is pivotally supported between extensions 226, 227 to pivot about a fourth axis 228. Prism isolation assembly 211 includes a Z-shaped support 230 and a pair of end plates 232. Plates 232 are secured to prism 18 by a suitable adhesive and to Z-shaped support 230 by screws 233. Prism 18 is pivotally mounted to third gimbal 212 through plates 232 so prism isolation assembly 211 and prism 18 pivot about a fifth, vertical axis 234.

As indicated in the figures, first, second and third axes 218, 220 and 222 are nominally orthogonal axes and intersect at a first point 236 (see FIG. 6). As used in this application nominally orthogonal means that the axes are orthogonal when the stabilized components are in their neutral positions shown in the figures. Fourth and fifth axes 228, 234 intersect third axis 222 at a second point 238 and are also nominally orthogonal. Second point 238 coincides with the combined center of gravity of prism 18 and prism isolation assembly 211 so that prism 18 tends to remain in its neutral position shown in the figures. The center of gravity of image stabilizing assembly 202 is preferably coincident with first point 236 so assembly 202 is balanced about first axis 218.

Rotor 210 has an enlarged outer region 240 which contains a series of magnets 241 with the north and south poles of the magnets alternating. Rotor 210 is mounted to rotor shaft 225 which passes within bearing block portion 224 of second gimbal 208. Rotor 210 acts as the rotor element for a brushless DC motor 244. The components comprising motor 244, excepting rotor 210, are mounted to a circular printed circuit board 246 which itself is mounted to second gimbal 208 by a pair of stand offs 248. A dish-shaped wind shield 249 is mounted to the peripheral edge 251 of printed circuit board 251. Shield 249 and board 251 prevent rotor 210 from creating turbulent air currents within the instrument, which would degrade the stabilization. The use of wind shield 249 also reduces the energy required to drive rotor 210. This is quite important because it extends the life of the batteries, commonly used to power motor 244, by a significant factor.

Motor 244 uses a Hall effect device which senses the position of the passing magnets 241. The motor stator 250 is energized and deenergized according to the output of the Hall effect device to alternately attract and repel magnets 241. This type of motor, which is well-known, causes rotor 210 to spin so that Cardan suspension assembly 204 provides a two degree of freedom gyroscopically stabilized support structure for prism isolation assembly 211 and prism 18.

It is desired to maintain third axis 222, that is the spin axis of rotor 210, parallel with the optical axis 10, shown in FIGS. 1, 2 and 6, of the optical instrument with which stabilizer 202 is used. To do this, a precessor 252 is used. Precessor 252 includes a main iron shaft 254 mounted to case 6 through an H-shaped mounting plate 255, shown in FIGS. 6 and 8A, and extends through a central opening 256 of a convex, circular copper disc 258. Disc 258 is supported by a circular extension 260 of rotor 210. A circular iron shoe 264 is mounted to shaft 254 on the other side of opening 256. A magnet 266 is mounted to an enlarged end 262 on the other side of opening 256 to provide a magnetic field 268 within opening 256.

Rotor 210, once spinning, tends to gyroscopically maintain its position against tilt and pan movements. However, during use the orientation of case 2 is changed as camera 4 is pointed in different directions. This movement of case 2 causes copper disk 258 to move into magnetic field 268. Since central opening 256 is no longer centered within field 268, a restoring torque is exerted on copper disk 258 tending to realign rotor 210 so third axis 222 once again becomes aligned with main viewing axis 250. Precessor 252 acts to restore the gyro axis parallel to the case axis because of the eddy current drag on disc 258 produced as the spinning disc passes through magnetic field 268. Thus, precessor 252 causes gyro axis to follow case axis, at low frequencies, but to leave the gyro axis essentially untorqued at high frequencies. This results in image stabilization plus the ability to pan.

As seen best in FIG. 5, third gimbal 212 is restored to a neutral position, that is where fifth axis 234 is perpendicular to third axis 222, by opposed magnets 270, 272. Magnets 270 are affixed, typically with adhesive, to opposite corners 274, 275 of third gimbal 212 while magnets 272 are mounted to vertical bars 276, 277 which are themselves connected to second gimbal 208 at positions near horizontal extensions 226, 227. Magnets 272 are located to be directly opposite magnets 270 with like poles facing one another, thus repelling one another. Other restoring means, such as springs, may also be suitable. Similarly, magnets 278, 280 are mounted to the distal ends 282, 283 of Z-shaped support 230 and to lugs 284, 285 on third gimbal 212 so that magnets 278, 280 are directly opposite one another with like poles opposed. This causes prism 18 to be restored to a neutral position, that is with front surface 286 of Humphrey prism 18 parallel to fourth axis 228. Magnets 280 are mounted to screws 281 so the distance between magnets 278, 280 can be adjusted to help tune the frequency response of prism 18. If desired, any of the other magnets can also be adjustably mounted to their respective supports.

Damping of the movement of third gimbal 212 relative to second gimbal and of prism 18 relative to third gimbal 212 is provided in the following manner. A set screw 286 is mounted to bar 277 and is positioned to extend into an opening (not shown) in third gimbal 212 which is filled with a viscous material, to form a dashpot. A set screw 288 is mounted to an ear 290 of support 230 for extension into an opening 292 in gimbal 212, opening 292 filled with a viscous material. Varying the extension of set screws 286, 288 allows the damping characteristics of isolation assembly 211 to be adjusted. The viscous material should be of a type which does not flow at the operating temperatures image stabilizing assembly 202 is expected to encounter. Evaporation of viscous material 290, 292 should be sufficiently small so as not to interfere with the optical qualities of the optical instruments. If desired, other types of damping means, such as wires mounted to one element frictionally engaging the adjacent element, can be used. Because of the delicate nature of assembly 202, the restoring and damping means chosen must be smooth acting at very low forces and rates and must act consistently.

Referring now to FIGS. 7, 8A and 8B, a pair of caging systems to 302, 304 are shown. Prism caging system 302 includes a forked arm 306 pivotally mounted to a support frame 308 at 310. Arm 306 includes three contact points 312, 314, 316, to which cork pads 318 are mounted, positioned to contact Humphrey prism 18 at three spaced apart points as in the solid line position of FIG. 7. When so positioned prism 18 is no longer free to pivot about axis 234 and is thus caged or locked in place. When image stabilization is desired during use, a cable 320 is extended by the user to pivot arm 306 forward to the dashed line position of FIG. 7 thus releasing or uncaging prism 18. A spring 322 normally biases arm 306 towards the solid line, caged position of FIG. 7. Providing this caging helps to prevent damage to prism 18 and other parts of assembly 202.

FIGS. 8A and 8B show gyro caging system in the locked or caged position and in the unlocked or uncaged position, respectively. System 304 includes H plate 255 mounted to support frame 308 by standoffs 324. Three mounting screws 326 are fixed to H plate 255 and extend on either side of the H plate. A circular actuating plate 328 is mounted between washers 330 at the outer ends of screws 326 and H plate 255. Plate 328 includes three slots 332 through which screws 326 pass and which allow plate 328 to be rotated between a first, caged position of FIG. 8A and a second, uncaged position of FIG. 8B. This is accomplished by the user by rotating knob 334 which extends through case 6. Knob 334 is mounted to a shaft 336 having an offset pin 338 at its outer end which engages a corresponding slot 340 in plate 328 to provide the desired rotary movement of plate 328.

Three dog-legged shaped caging claws 342 are mounted at their ends to the outer ends of screws 326 between H plate 255 and windshield 249. Claws 342 each include an axially outwardly extending pin 344 extending from claws 342 to engage guide slots 346 in plate 328. Slots 346 are sized and positioned to guide the outer ends 348 of claws 342 between the caged position of FIG. 8A, in which outer ends 348 press against the circular ledge 350 of windshield 249, and the uncaged position of FIG. 8B in which outer ends 348 do not press against windshield 249. In the caged position of FIG. 8A windshield 249 is locked in place. Since windshield 249 is mounted to second gimbal 208, to which rotor 210 is mounted, locking windshield 249 in place locks or cages Cardan suspension assembly 204 to keep it from moving. Caging is primarily used when the instrument is not used to protect assembly 202 from damage.

Plate 328 is kept in either its fully caged or fully uncaged positions of FIGS. 8A and 8B by the use of a spring 352. Spring 352 is connected to plate 255 at one end by a standoff 354 and to a triangular coupling plate 356 at its other end. Plate 356 is pivotally mounted to H plate 255 at a pivot point 358 and to actuating plate 328 at a pivot point 360. Spring 352 and plate 356 are arranged so that spring 352 passes through a line connecting standoff 354 and pivot point 358 when actuating plate 328 is rotated between the caged and uncaged positions. This allows spring 352 to keep plate 328 in either the caged or uncaged position.

The restoring and damping structures described above for the various elements of stabilizer 202 are adapted to filter out substantially all vibrations on prism 18 above about 2 Hz. Prism isolation assembly 211 thus acts as a mechanical low pass filter isolating prism 18 from high frequency vibrations. This can be very important since rotor 210 and the other components of motor 244 commonly produce high frequency vibrations which would otherwise vibrate prism 18.

Optically stabilized camera lens systems 2, 100 find particular utility for use with hand held or shoulder supported optical instruments, such as video camera 4 shown in FIG. 1. Stabilizing assembly 202 may also be useful for use with still cameras using telephoto lenses under low light conditions or with movie cameras. Stabilizing assembly 202 may also be used with high magnification binoculars or mono-binoculars, in which latter cases roll stabilization is not desired.

Modification and variation can be made to the disclosed embodiments without departing from the subject of the invention as defined in the following claims.

We claim:

1. A lens system for use with a camera having an image plane comprising:
 a case;
 an objective lens forming a first optical element mounted to the case for receipt of light along an optical axis; and
 an optical train defining an optical path within the case between the first optical element and the image plane, said optical train comprising:
   a second reflecting and displacing optical element positioned along the optical path following the first optical element, said second optical element arranged and adapted to redirect the light entering the second optical element from a first path segment of the optical path to a second, laterally spaced apart path segment of the optical path to form a first image along said second path segment;
   means for inertially mounting said second optical element to said case to compensate for small accidental motions of the case so the first image is a stabilized image;
   a third cube corner reflecting optical element mounted within said case following the second optical element, said corner cube optical element arranged and adapted to relay light from said second optical element to a third, laterally spaced apart path segment of said optical path;
   said optical train arranged and adapted to relay light along said optical path from said third optical element to form a second image at the image plane; and
   a zoom relay lens assembly mounted within the case and following the third optical element.

2. A lens system for use with a camera having an image plane comprising:

a case;

an objective lens mounted to the case for receipt of light along an optical axis forming a first optical element; and an optical train defining an optical path within the case between the first optical element and the image plane, said optical train comprising:

a second reflecting and displacing optical element positioned along the optical path following the first optical element, said second optical element arranged and adapted to redirect the light entering the second optical element from a first path segment of the optical path to a second, laterally spaced apart path segment of the optical path to form a first image along said second path segment;

means for inertially mounting said second optical element to said case to compensate for small accidental motions of the case so the first image is a stabilized image;

a third optical element comprising two reflecting surfaces mounted within said case following the second optical element, said third optical element arranged and adapted to relay light from the second optical element to a third, laterally spaced apart and reversed path segment; and a fourth optical element including a zoom relay lens assembly mounted within the case and following the third optical element; and a fifth optical element comprising a parity inverting prism having reflective surfaces arranged and adapted to relay light along said optical path from said third optical element to form a second image at the image plane having even parity.

3. The lens system of claim 2 and wherein said parity inverting prism is a Pechan prism.

4. The lens system of claim 2 and wherein said prism assembly is a Dove prism.

5. A lens system for use with a camera having a image plane comprising:

a case;

a first optical element mounted to the case of receipt of light along an optical axis;

an optical train defining an optical path within the case between said first optical element and the image plane, said optical plane comprising:

means for stabilizing to said image plane an image received through said optical train;

a derotating prism mounted to said case for pivotal movement about said optical path;

a roll stabilizing gyro mounted to the case, said gyro including a gimbal pivotally mounted to said case for movement about a gimbal axis parallel to said optical axis, a rotor pivotally supported by said gimbal to spin about a gyro axis, the gyro axis being oriented in a direction other than parallel to said optical axis; and means for operably coupling the gyro and the derotating prism to rotate said derotating prism at one-half the gimbal motion to obtain stabilization of an image.

6. The invention of claim 5 and wherein said derotating prism comprises a Pechan prism.

7. A camera lens system comprising a case defining an optical path for receipt of light along an optical axis to an image plane; an objective lens, mounted to the case and an optical train mounted within the case comprising:

a reflecting and displacing optical element positioned along the optical path following the objective lens;

a reversing and displacing optical element positioned along the optical axis, following said reflecting and displacing optical element, the reflecting and displacing optical element being arranged and adapted to laterally offset and reverse the direction of light from the reflecting and displacing optical element; and means for inertially mounting said reflecting and displacing optical element to the case so as to maintain an original angular orientation with respect to the optical axis in response to small tilts and hand movements of the case, said means for inertially mounting including a Cardan suspension system including first and second gimbals and a rotor, said first gimbal mounted to the case for pivotal movement about a first axis, said second gimbal mounted to said first gimbal for pivotal movement about a second axis, said rotor mounted to said second gimbal for rotation about a third axis;

means for restoring said rotor as mounted to said first and second gimbals to a preselected position of excursion of each of said first and second gimbals to enable maximum excursion of said rotor relative to the case;

a third gimbal pivotally mounted to the second gimbal for rotation about a fourth axis;

said reflecting and displacing optical element being mounted to said third gimbal for pivotal movement about a fifth axis; and said third gimbal and said reflecting and displacing prism biased to a preselected position of excursion of said third gimbal and said reflecting and displacing prism and damped sufficiently to substantially inhibit vibrations above a chosen frequency from reaching the optical element.

8. An image position stabilizing assembly comprising:

a Cardan suspension assembly including:

a first gimbal pivotally secured to a base for pivotal movement about a first axis;

a second gimbal mounted to said first gimbal for pivotal movement about a second axis; and a rotor rotatably mounted to said second gimbal for rotation about a third axis;

means for restoring said rotor to a preselected orientation with respect to said case whereby said first and second gimbals are predisposed for excursion relative to said case relative to said base;

a reflecting and displacing optical element; and a low frequency mechanical bandpass filter mounting means for mounting said reflecting and displacing optical element to said second gimbal, said low frequency mechanical bandpass filter including a third and fourth gimbals mounted on respective fourth and fifth axes.

9. An optical element stabilizer comprising:

a case;

a Cardan suspension system including first and second gimbals and a rotor, said first gimbal mounted to the case for pivotal movement about a first axis, said second gimbal mounted to said first gimbal for pivotal movement about a second axis, said rotor mounted to said second gimbal for rotation about a third axis;

means for restoring said rotor to a preselected position relative to said case to dispose said first and second gimbals for excursion relative to said case;

a third gimbal pivotally mounted to said second gimbal for rotation about a fourth axis;

reflecting and displacing prism mounted to said third gimbal for pivotal movement about a fifth axis; and said third gimbal and said prism biased to respective home positions and damped sufficiently to substantially inhibit vibrations about a chosen frequency from reaching said optical element.

10. The stabilizer of claim 9 wherein said chosen frequency is about 2 Hz.

11. A method for stabilizing an optical element comprising the following steps:

pivotally mounting a Cardan suspension assembly, including first and second gimbals and a rotor, to the case of an optical instrument through the first gimbal;

restoring said rotor to a home orientation relative to the case;

pivotally mounting a third gimbal to the second gimbal;

pivotally mounting a reflecting and displacing optical element to the third gimbal; and biasing and damping said third gimbal relative to said second gimbal and said optical element relative to said third gimbal to bias said third gimbal and said optical element to respective home orientations and to substantially inhibit vibrations above a chosen frequency from being transmitted to the optical element.

* * * * *